(12) United States Patent
Chen et al.

(10) Patent No.: US 9,038,516 B2
(45) Date of Patent: May 26, 2015

(54) SAW MACHINE RIVING KNIFE ADJUSTMENT MECHANISM

(75) Inventors: Jung-Huo Chen, Taichung (TW); Cheng-Hung Chiu, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 706 days.

(21) Appl. No.: 12/974,370

(22) Filed: Dec. 21, 2010

(65) Prior Publication Data

US 2011/0154966 A1     Jun. 30, 2011

(30) Foreign Application Priority Data

Dec. 30, 2009   (TW) ................................ 98145852 A

(51) Int. Cl.
*B27G 19/08*     (2006.01)
*B27B 5/29*      (2006.01)
*B23D 47/04*     (2006.01)

(52) U.S. Cl.
CPC . *B27G 19/08* (2013.01); *B27B 5/29* (2013.01); *B23D 47/042* (2013.01)

(58) Field of Classification Search
CPC ...... B23D 45/067; B23D 47/02; B23D 47/04; B23D 47/047; B27B 5/222; B27B 5/243; B27B 5/29; B27G 19/02; B27G 19/08
USPC ................ 83/102.1, 477.2, 438, 478, DIG. 1
See application file for complete search history.

(56) References Cited

U.S. PATENT DOCUMENTS

| | | | |
|---|---|---|---|
| 6,840,144 B2 | 1/2005 | Huang | |
| 7,137,327 B2 | 11/2006 | Garcia et al. | |
| 7,210,386 B1 | 5/2007 | Chang | |
| 7,437,981 B2 | 10/2008 | Burke et al. | |
| 7,475,622 B1 | 1/2009 | Chang | |
| 7,540,223 B2 | 6/2009 | Sasaki et al. | |
| 7,621,204 B2 | 11/2009 | Merhar, III et al. | |
| 7,921,755 B2 * | 4/2011 | Weston et al. | ............... 83/102.1 |

(Continued)

FOREIGN PATENT DOCUMENTS

| | | |
|---|---|---|
| CN | 2846047 Y | 12/2006 |
| CN | 201012414 Y | 1/2008 |

(Continued)

OTHER PUBLICATIONS

Chinese Office Action dated Oct. 31, 2012 for CN 201010116446.2, and English Translation thereof.

(Continued)

*Primary Examiner* — Clark F Dexter
(74) *Attorney, Agent, or Firm* — Bacon & Thomas, PLLC

(57) ABSTRACT

An adjustable riving knife assembly including a riving knife and a saw machine riving knife adjustment mechanism, the adjustment mechanism including a locating member and a locking unit. The locating member defines a track, and the riving knife has a riving knife body and a coupling portion inserted into the track. The locking unit includes an axle holder affixed to the locating member, a brake mounted on the axle holder, an operating member connected to the brake and a locking member to be driven by the brake. Rotation of the operating member causes the brake to move the locking member relative to the riving knife between a locking position, where the locking member engages the riving knife, and an unlocking or adjusting position, where the locking member is disengaged from the riving knife.

6 Claims, 11 Drawing Sheets

(56) References Cited

U.S. PATENT DOCUMENTS

| | | |
|---|---|---|
| 2005/0188806 A1* | 9/2005 | Garcia et al. ............... 83/471.3 |
| 2006/0096428 A1 | 5/2006 | Garcia et al. |
| 2007/0034066 A1 | 2/2007 | Garcia et al. |
| 2007/0056416 A1 | 3/2007 | Shibata |
| 2007/0157784 A1 | 7/2007 | Gass et al. |
| 2007/0186739 A1 | 8/2007 | Peot et al. |
| 2007/0277661 A1 | 12/2007 | Domeny et al. |
| 2008/0047410 A1 | 2/2008 | Chuang |
| 2008/0168875 A1 | 7/2008 | Liu et al. |
| 2008/0276780 A1* | 11/2008 | Chuang ..................... 83/508 |
| 2008/0302445 A1 | 12/2008 | Shibata et al. |
| 2009/0145275 A1 | 6/2009 | Chuang |
| 2009/0158906 A1 | 6/2009 | Shibata |
| 2009/0205472 A1 | 8/2009 | Saski et al. |
| 2009/0266213 A1 | 10/2009 | Liu et al. |
| 2009/0288303 A1 | 11/2009 | Liao |
| 2010/0005937 A1 | 1/2010 | Weston et al. |
| 2010/0126324 A1 | 5/2010 | Liu et al. |

FOREIGN PATENT DOCUMENTS

| | | |
|---|---|---|
| EP | 1533092 A1 | 5/2005 |
| JP | 2005262337 A | 9/2005 |
| TW | M280905 U | 11/2005 |
| TW | M299639 U | 10/2006 |
| TW | M317330 U | 8/2007 |
| TW | M330176 U | 4/2008 |
| TW | 200829356 A | 7/2008 |
| TW | M360776 U | 7/2009 |

OTHER PUBLICATIONS

Taiwanese Office Action dated Apr. 17, 2012 for TW 098145852, and English Translation thereof.

* cited by examiner

SAW MACHINE RIVING KNIFE ADJUSTMENT MECHANISM

This application claims, under 35 U.S.C. §119, priority to Taiwanese Application No. 098145852, filed Dec. 30, 2009, which application is hereby incorporated by reference in its entirety, inclusive of the specification, claims, and drawings.

FIELD OF THE INVENTION

The present disclosure relates to saw machines and more particularly, to a riving knife adjustment mechanism for a saw machine.

BACKGROUND

A saw machine has safety devices to protect the operator from injury. For example, a riving knife may be fixedly mounted on the machine base behind the saw blade to prevent a phenomenon known as kickback, which occurs when the wood being cut is caught by the rear edge of the saw blade, lifted off the table, and propelled backwards toward the operator.

Such safety devices typically require adjustment. In particular, when changing out different sizes of saw blades for cutting different thickness of wooden materials, or when switching out different saw blades used for different working conditions, the height of the saw blade may have to be adjusted up and down. In such a case, the riving knife may also have to be adjusted subject to the adjusted position of the saw blade. Therefore, it is a desired function of a saw machine to allow quick mounting, dismounting and adjustment of the riving knife.

U.S. Pat. No. 6,840,144 B2 discloses a riving knife mounting structure, as reproduced in FIG. 1, which includes a control plate 1 having a sloping face 102, and which is movable to control a spring-loaded pin 2, causing the spring-loaded pin 2 to engage with a retaining hole 301 on a riving knife 3 or to move away from the retaining hole 301. Thus, the riving knife 3 can be vertically adjusted or detached from the machine for replacement.

Additionally, U.S. Pat. No. 7,437,981 B2, Taiwan Patent No. TW 1305160 and TW M280905 also disclose quick-detachable, quick-adjustable riving knife mounting structures.

The structure disclosed in U.S. Pat. No. 6,840,144 B2 (as shown in FIG. 1) allows for quick adjustment or replacement of the riving knife 3 on a mounting frame 4. However, when adjusting or replacing the riving knife 3, the operator must insert a hand into the inside of the machine base of the saw machine (not shown) to operate the control plate 1 within a narrow space. As such, it is inconvenient to operate this structure. U.S. Pat. No. 7,437,981 B2, Taiwan Patent No. TW 1305160 and TW M280905 also disclose structures that have the same problem.

SUMMARY

The present disclosure has been accomplished under the circumstances in view. Accordingly, embodiments of the present disclosure provide a riving knife adjustment mechanism for a saw, which is easily and rapidly operable to adjust the position of the riving knife.

Therefore, embodiments according to the present disclosure provide an adjustable riving knife assembly including a riving knife and a riving knife adjustment mechanism installed in a machine base having a top wall. The riving knife adjustment mechanism includes a locating member and a locking unit. The locating member is disposed below the top wall of the machine base, and has a track extending along a longitudinal direction toward the top wall of the machine base. The riving knife has a coupling portion slidably inserted into the track of the locating member. The locking unit is installed on the locating member below the top wall of the machine base, and includes a locking member eccentrically rotatable to adjustably and selectively lock and hold or release the riving knife.

Embodiments of a riving knife adjustment mechanism according to the present disclosure have the effects that operating the locking unit can adjustably and selectively lock and hold or release the riving knife, thus facilitating quick adjustment of the riving knife.

DETAILED DESCRIPTION

Other and further advantages and features of the disclosure will be understood by reference to the following specification in conjunction with the accompanying drawings, in which like reference signs denote like elements of structure.

Figure 2:
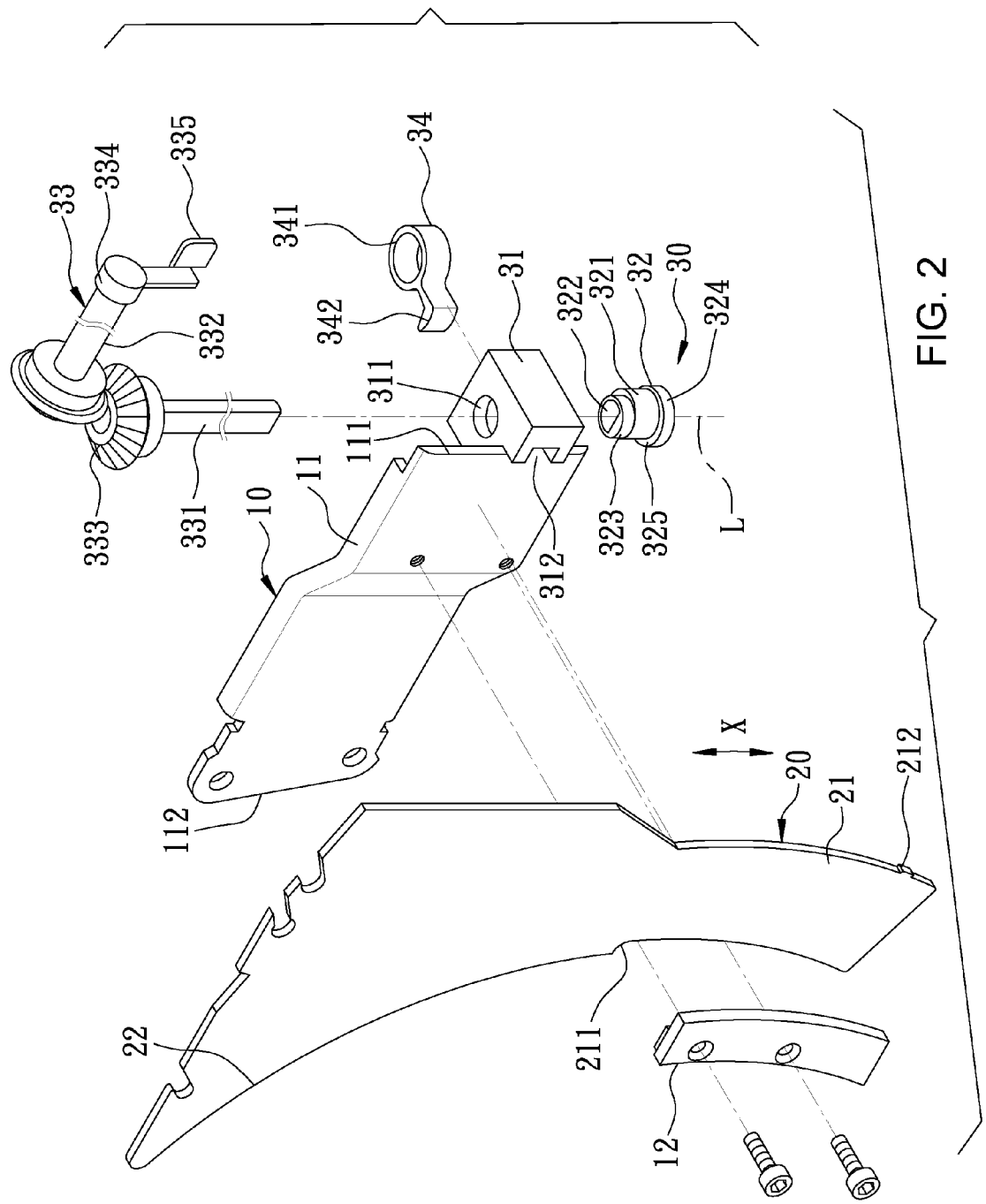
FIG. 2 is an exploded view of a riving knife and a saw machine riving knife adjustment mechanism in accordance with a first embodiment of the present disclosure.
Figure 3:
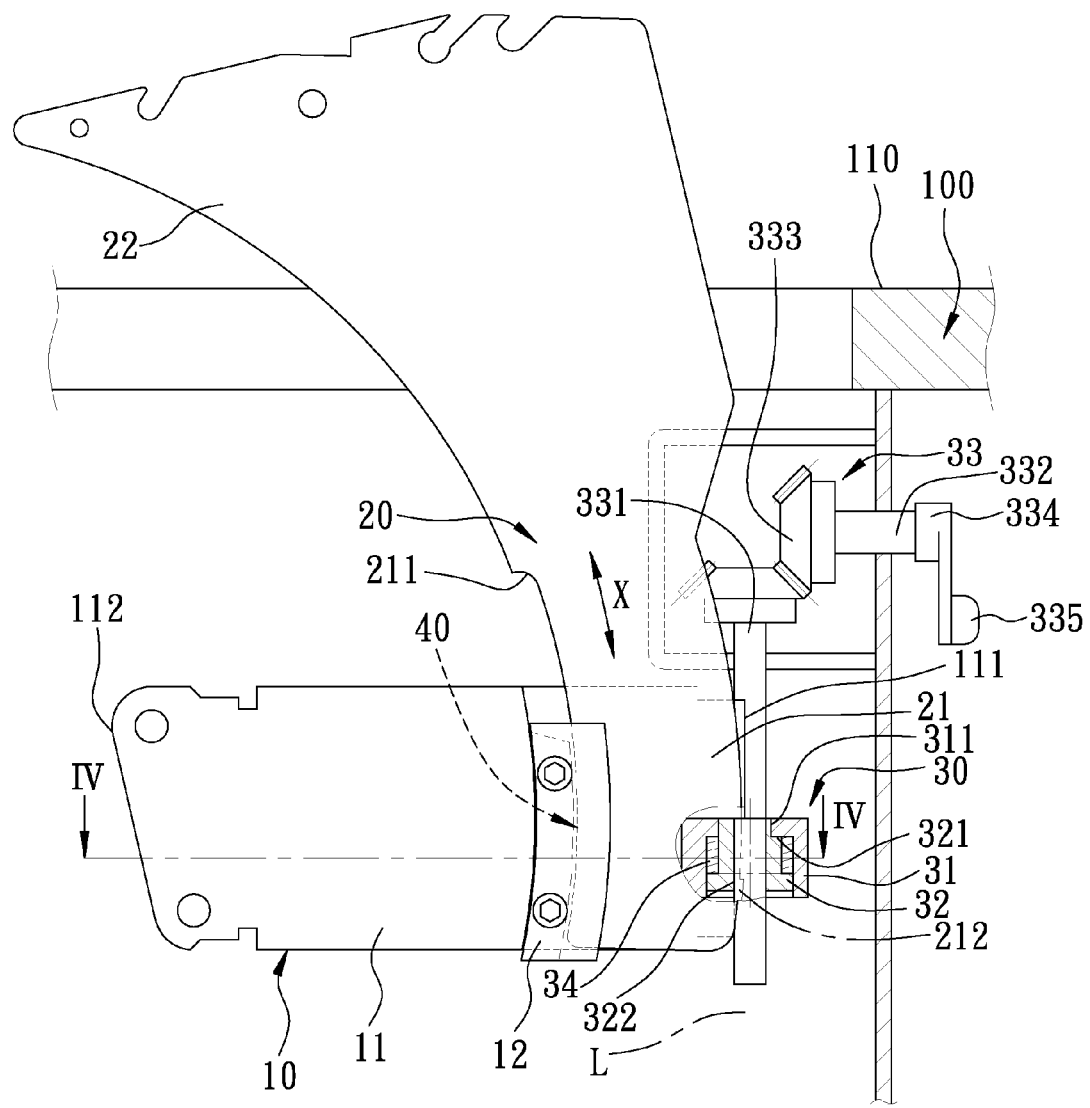
FIG. 3 is a plain assembly view of the riving knife and the saw machine riving knife adjustment mechanism in accordance with the first embodiment of the present disclosure, illustrating the riving knife in the highest position relative to the locating member.
Figure 4:
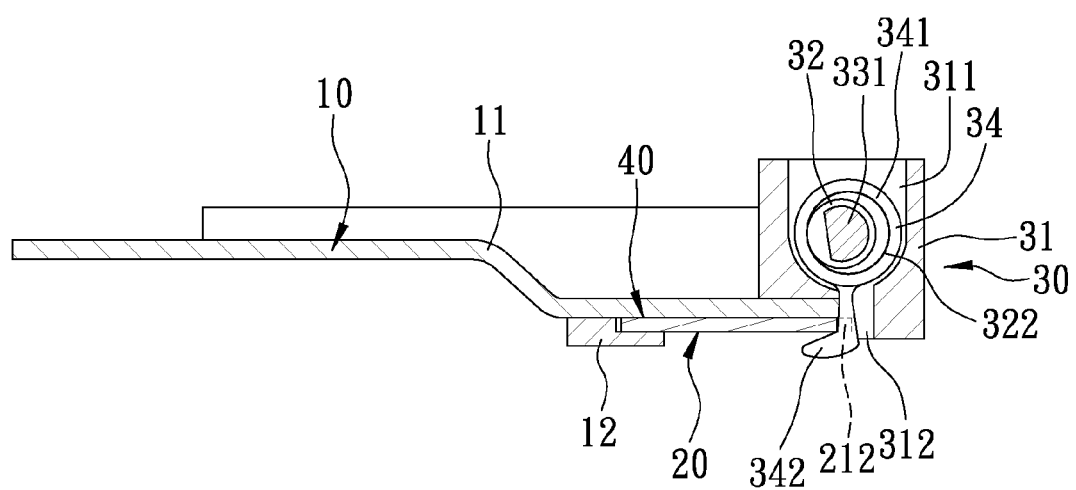
FIG. 4 is a sectional view taken along line IV-IV of FIG. 3, illustrating the retaining portion of the riving knife in a locking position.

Referring to FIGS. 2, 3 and 4, an adjustable riving knife assembly including a riving knife 20 and a saw machine riving knife adjustment mechanism in accordance with the first embodiment of the present disclosure is shown installed in a machine base 100 that has a top wall 110. The riving knife adjustment mechanism includes a locating member 10 and a locking unit 30.

The locating member 10 is fixedly mounted to a saw blade holder (not shown) on the inside of the machine base 100 below the top wall 110, and includes a body base 11 and a constraint block 12 that has an inverted L-shape cross section (see FIG. 4). The constraint block 12 is fixedly fastened to the body base 11. The body base 11 has a first lateral edge 111 and a second lateral edge 112 opposed to the first lateral edge 111. The constraint block 12 is affixed to one side of the body base 11 between the opposed first and second lateral edges 111, 112.

The locking unit 30 includes an axle holder 31 affixed to the first lateral edge 111 of the body base 11 of the locating member 10, a brake 32 mounted in the axle holder 31, an operating member 33 connected to the brake 32, and a locking member 34 movable by the operating member 33.

The axle holder 31 and the constraint block 12 define therebetween a track 40 (FIG. 3) that extends along a longitudinal direction X toward the top wall 110. The axle holder 31 includes an axle hole 311 extending along an axis L corresponding to the longitudinal direction X, and an opening 312 extending through the axle holder 31 from the axle hole 311 to the track 40.

The brake 32 includes a cylindrical brake portion 321 disposed in an eccentric manner relative to the axis L, a noncircular coupling hole 322 extending along the axis L, a first end portion 323 extending along the axis L at a first end of the cylindrical brake portion 321 and inserted into the axle hole 311, a second end portion 324 extending along the axis L at an opposed second end of the cylindrical brake portion 321 and inserted into the axle hole 311, and a shoulder 325 between the cylindrical brake portion 321 and the second end portion 324. The noncircular coupling hole 322 extends through the first end portion 323 and the second end portion 324.

The operating member 33 includes a first shaft 331 inserted through the coupling hole 322, a second shaft 332 arranged in a right-angle manner relative to the first shaft 331 and a transmission gear set 333 (two meshed bevel gears) positioned between the first shaft 331 and the second shaft 332. The first shaft 331 has a noncircular cross section (the shape of a segment of a circle) corresponding to the cross section of the noncircular coupling hole 322. The second shaft 332 includes an operating portion 334 extending through and out of the machine base 100 and terminating in a grip 335.

The locking member 34 includes a collar 341 and a retaining portion 342 extending from the periphery of the collar 341. The collar 341 is arranged on the cylindrical brake portion 321 and is stopped against and rests on the shoulder 325. The retaining portion 342 passes through the opening 312 of the axle holder 31 and extends into the track 40. Due to the corresponding structure of the noncircular shape (segment of a circle) of the first shaft 331 and the coupling hole 322, the locating member 10 and the locking unit 30 can be moved along the axis L relative to the top wall 110 of the machine base 100.

The riving knife 20 includes a coupling portion 21 slidably inserted into the track 40 of the locating member 10, and a riving knife body 22 connected to one end of the coupling portion 21, corresponding to the top wall 110. The coupling portion 21 includes an upper limit stop 211 disposed at a first lateral side thereof adjacent to the riving knife body 22, and a lower limit stop 212 disposed at a second lateral side thereof remotely spaced from the upper limit stop 211.

Referring to FIGS. 3 and 4, when the riving knife body 22 of the riving knife 20 protrudes over the top wall 110 of the machine base 100 and reaches an upper limit position (the highest position), the lower limit stop 212 is retained in position relative to the locking member 34 of the locking unit 30 by engagement of the lower limit stop 212 with the retaining portion 342. At this time, the operating member 33 can be manipulated (rotated) to drive the eccentrically disposed cylindrical brake portion 321 to move (rotate) the collar 341 of the locking member 34 into a locking position where the retaining portion 342 of the locking member 34 is also forced into engagement with the coupling portion 21 of the riving knife 20, thereby locking the riving knife 20 to the machine base 100 and in a fixed position relative thereto.

Figure 5:
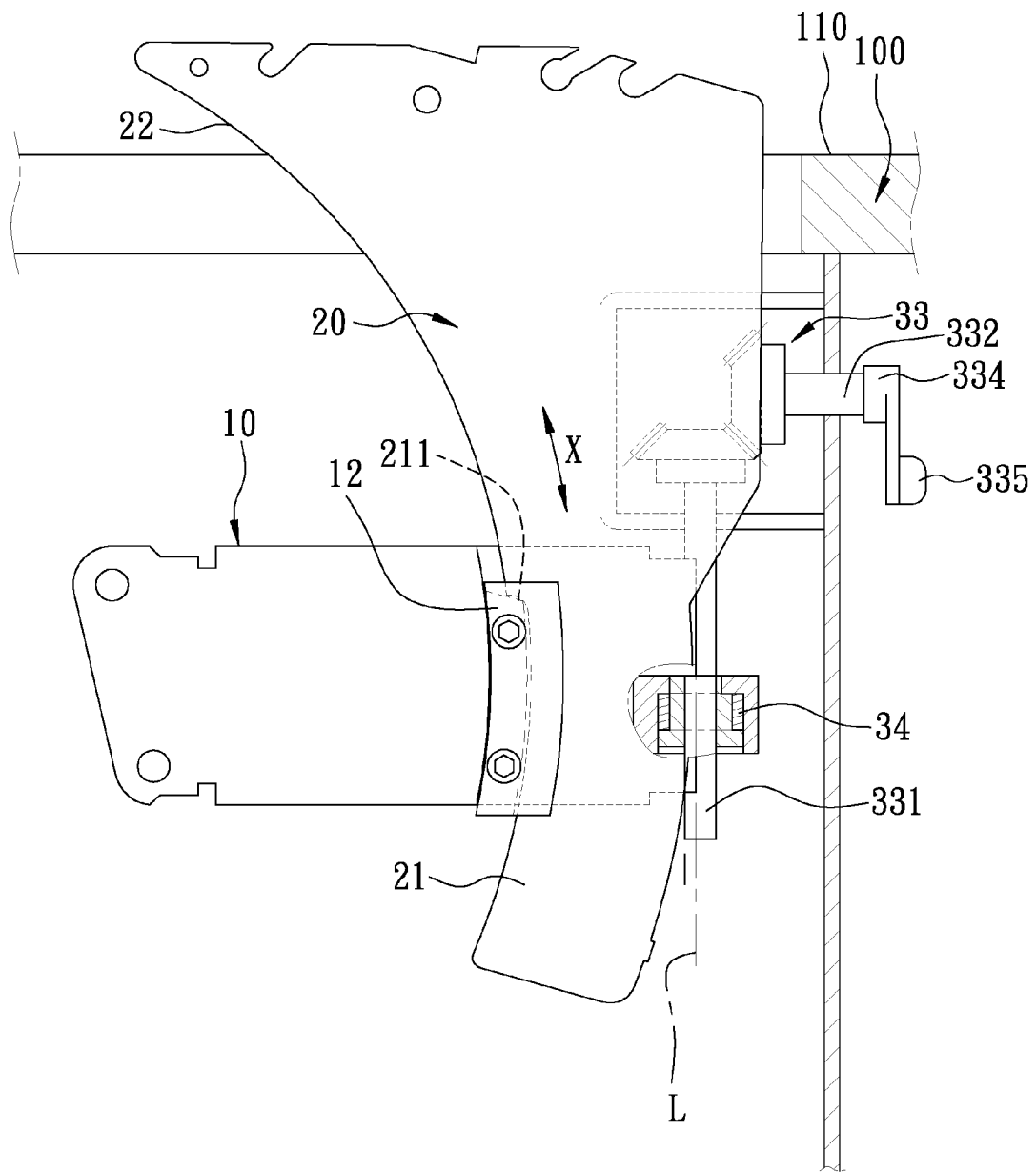
FIG. 5 is similar to FIG. 3 but illustrating the riving knife in the lowest position relative to the locating member.
Figure 6:
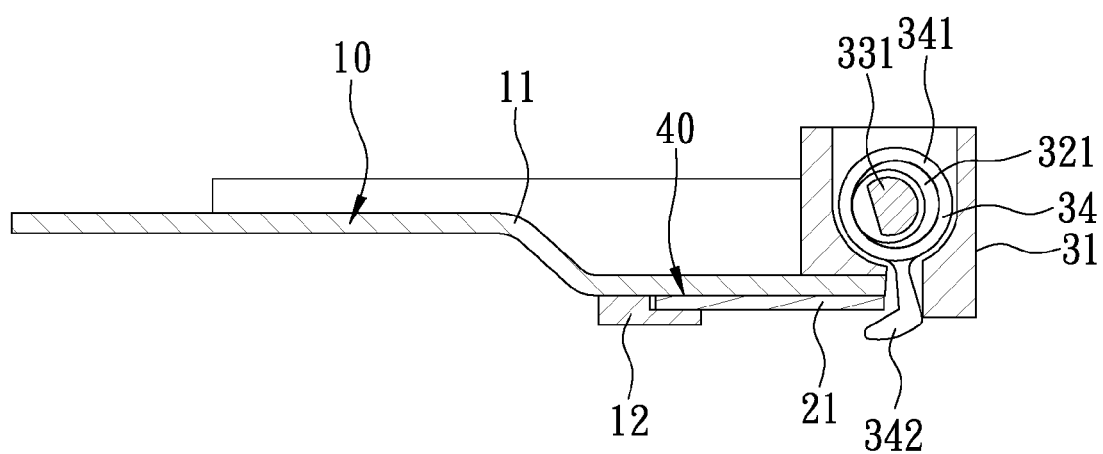
FIG. 6 is similar to FIG. 4 but illustrating the retaining portion of the riving knife in an unlocking position.

In order to adjust, detach, or replace the riving knife 20, as shown in FIGS. 5 and 6, the grip 335 of the operating member 33 can be manipulated to rotate the second shaft 332 and to further rotate the brake 32 about the axis L relative to the axle holder 31 by transmission of movement through the transmission gear set 333 and the first shaft 331.

At this time, as shown in FIG. 6, the cylindrical brake portion 321 of the brake 32 causes an opposite rotation of the collar 341 of the locking member 34, thus moving the retaining portion 342 away from the coupling portion 21 of the riving knife 20 to an unlocking position.

After disengagement of the retaining portion 342 from the coupling portion 21, the user can push down on the top edge of the riving knife body 22 to move the coupling portion 21 downwards along the longitudinal direction X to the lower limit position (the lowest position) where the upper limit stop 211 of the coupling portion 21 engages and is stopped against the top edge of the constraint block 12 of the locating member 10. Thus, the riving knife body 22 is disposed in the lowest position relative to the top wall 110. Of course, the riving knife 20 can be adjusted to any position between the upper and lower limits.

After adjustment of the position of the riving knife 20, the user can move the grip 335 in the opposite direction to return the locking member 34 to the locking position, as shown in FIG. 4.

Thus, the disclosed embodiment provides the operating member 33 for moving the locking member 34 between the locking position and the unlocking position, allowing the user to conveniently adjust the position of the riving knife 20. Further, the disclosed the saw machine riving knife adjustment mechanism is quite simple.

Further, by way of the arrangement of the first shaft 331, second shaft 332, transmission gear set 333, operating portion 334, and grip 335 of the operating member 33, the grip 335 is suspended outside of the machine base 100 for operation by the user to move the retaining portion 342 between the locking position and the unlocking position. Accordingly, the user does not need to insert a hand into the inside of the machine base 100 and will also, therefore, not encounter any restriction in operating space when adjusting the position of the riving knife 20. When compared to the prior art structure shown in FIG. 1, the operation of embodiments of a riving knife adjustment mechanism according to this disclosure is simple and easy.

During operation of the saw machine, the user may have to adjust the elevation of the saw blade (not shown) subject to change of the thickness of the workpiece. When elevation of the saw blade is changed, the locating member 10 and the riving knife 20 can be moved along with the saw blade, since the locating member 10 can be moved up and down along the first shaft 331 of the operating member 33. Further, the operating member 33 is rotatably mounted in a fixed location at the machine base 100 and is therefore not movable up and down with the locating member 10.

Figure 1:
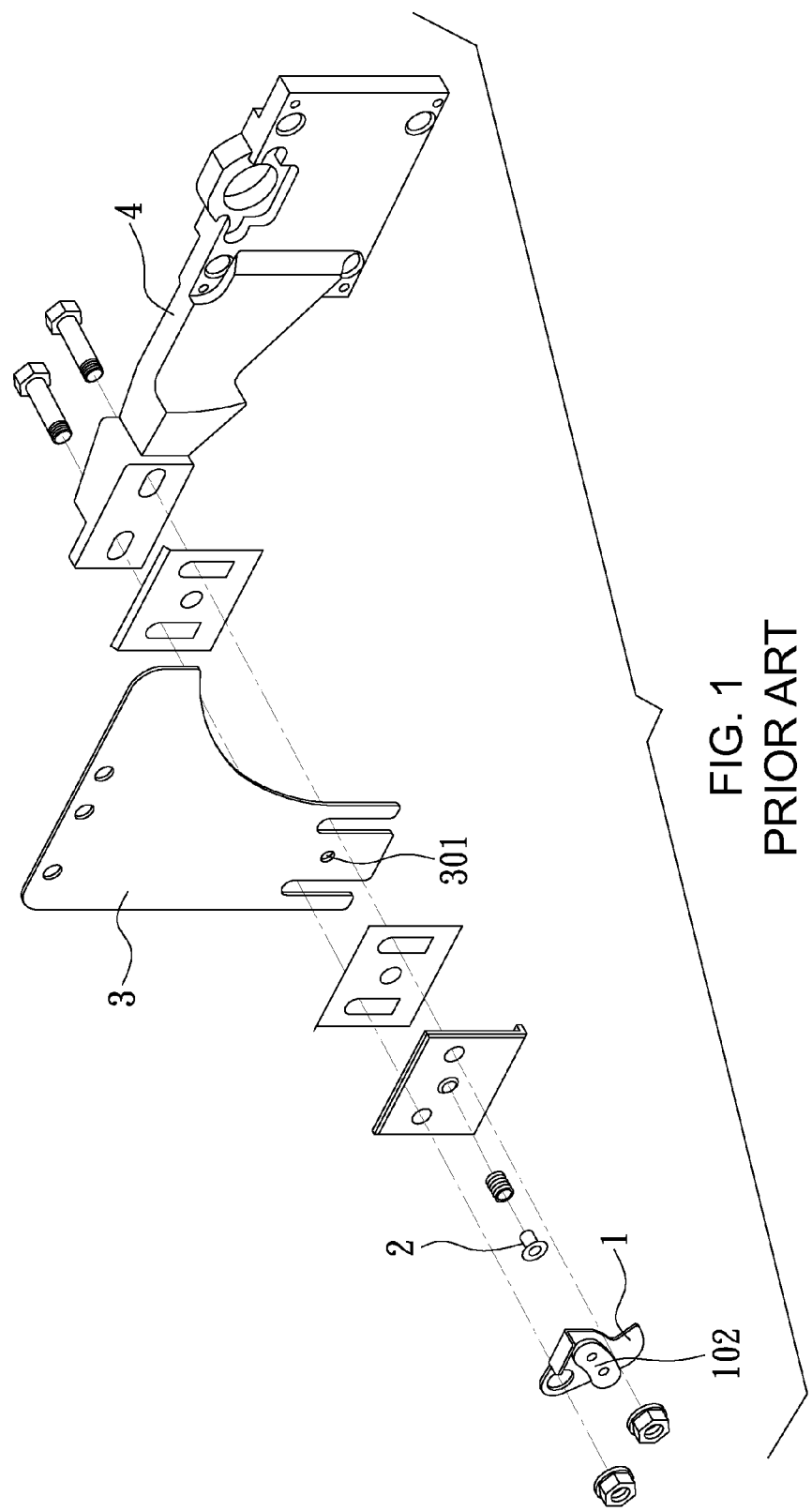
FIG. 1 is an exploded view of a riving knife and a saw machine a riving knife adjustment structure according to the prior art.

Thus, embodiments according to the disclosure eliminate inconvenient riving knife 3 adjustment operations and other drawbacks of the prior art structure, shown in FIG. 1, in which the control plate 1 is mounted on the mounting frame 4 and the mounting frame 4 must be lifted to the upper limit position before adjustment of the riving knife 3 can be made in order to avoid the control plate 1 being moved deep inside of the machine base. According to the embodiments of the present disclosure, the operating portion 334 of the operating member 33 is constantly kept at a fixed location and will not be moved up and down along with the locating member 10, thus simplifying adjustment of the position of the riving knife 20.

Further, the operating portion 334 of the operating member 33 is retained outside of the machine base 100, for convenient operation by the user to adjust the position of the riving knife 20 when desired.

Figure 7:
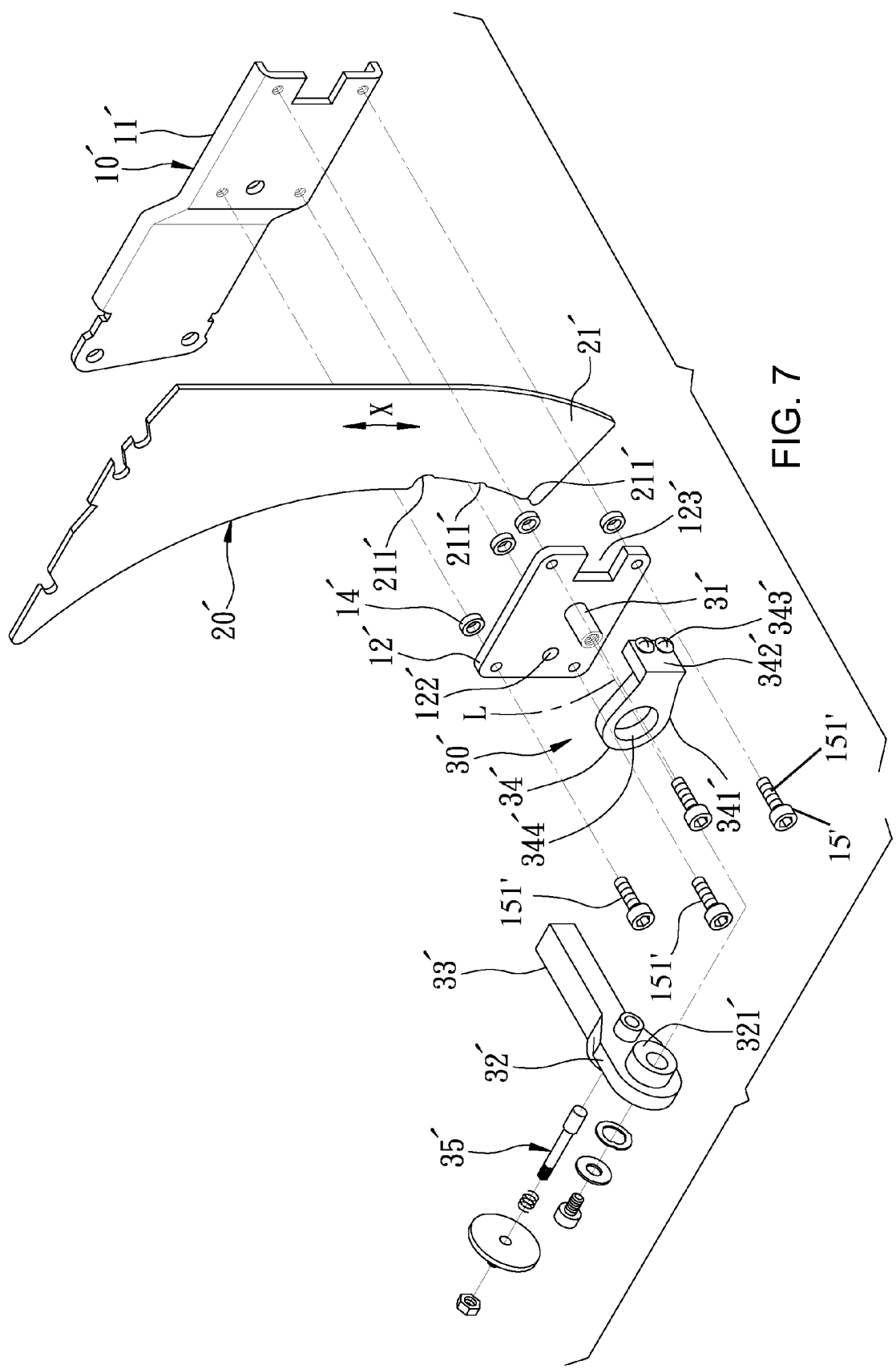
FIG. 7 is an exploded assembly view of a riving knife and a saw machine riving knife adjustment mechanism in accordance with a second embodiment of the present disclosure.

FIG. 7 illustrates an adjustable riving knife assembly including a riving knife 20' and a saw machine riving knife adjustment mechanism in accordance with a second embodiment of the present disclosure. The riving knife adjustment mechanism according to this second embodiment includes a locating member 10' and a locking unit 30'.

The locating member 10' includes a body base 11', a constraint block 12' mounted on one side of the body base 11', a plurality of cushion rings 14' provided between the body base 11' and the constraint block 12', a track 40' (FIG. 8) defined between the body base 11' and the constraint block 12' subject to the arrangement of the cushion rings 14', and a plurality of fastening members, for example screws 15' inserted through the cushion rings 14' to affix the constraint block 12' to the body base 11'.

Figure 8:
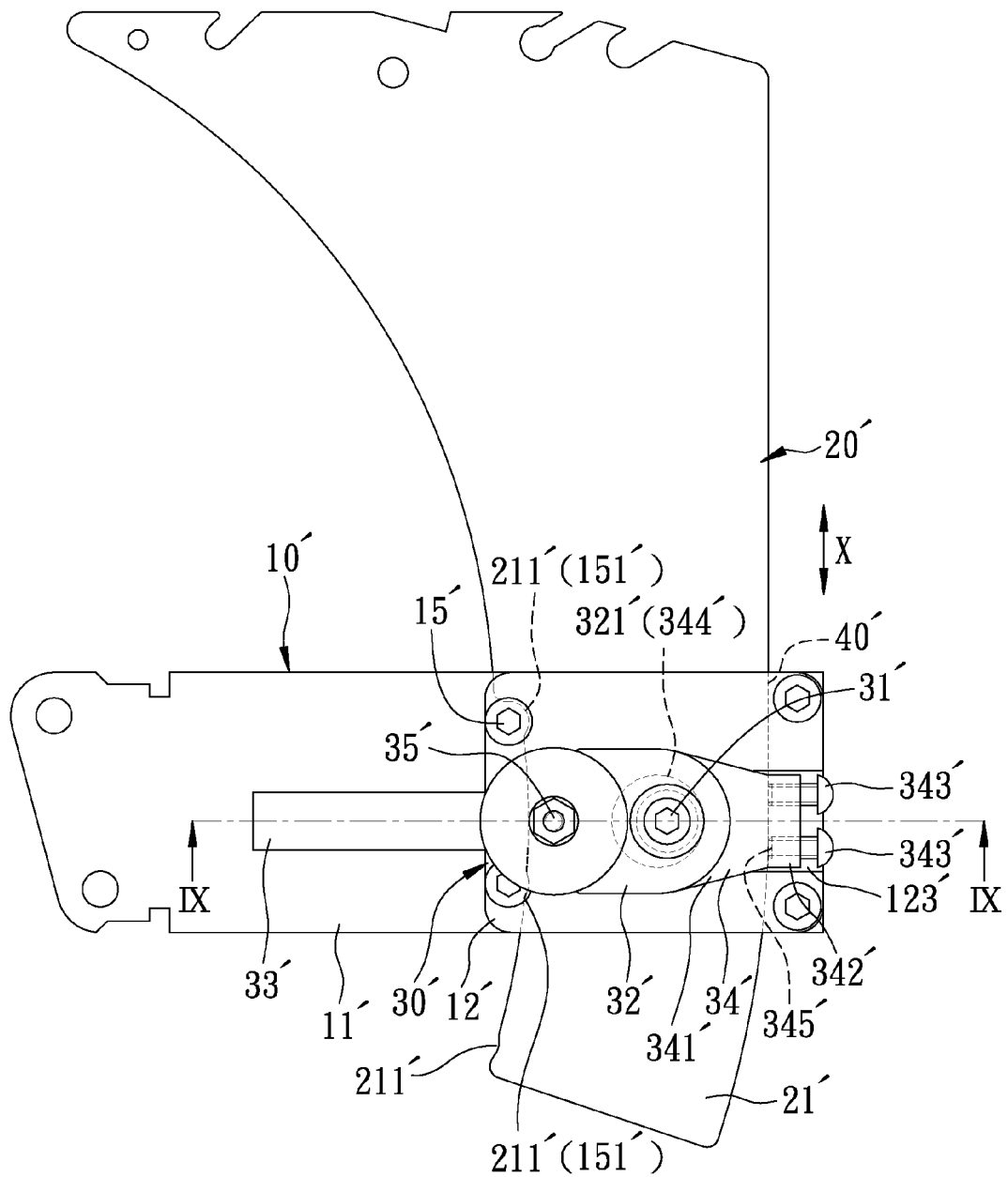
FIG. 8 is a plain assembly view of the riving knife and the saw machine riving knife adjustment mechanism in accordance with the second embodiment of the present disclosure.

The constraint block 12' includes a locating hole 122' defined therethrough from a first side to a second side facing the body base 11', and a cutout opening 123' defined in one lateral side thereof and extending across and into a portion of the track 40'. The track 40' extends along a longitudinal direction X. The fastening members 15' form two protruding locating portions 151' at an inner side relative to the track 40' (FIG. 8).

The riving knife 20' includes three notches 211' formed in an edge and vertically spaced along a first lateral side of the coupling portion 21' thereof.

The locking unit 30' includes a post-like axle holder 31' perpendicularly and fixedly mounted on the constraint block 12', a brake 32' coupled to the axle holder 31', an operating member 33' connected to the brake member 32', a locking member 34' operable by the brake 32', and a spring-loaded pin 35'.

The brake 32' includes a brake portion 321' shaped like a round block and disposed in an eccentric manner relative to an axis L.

The locking member 34' includes a base panel 341' attached to the constraint block 12', a retaining portion 342' extending from a first end of the base panel 341' and inserted into the opening 123', and two adjustment screws 343' threaded into the retaining portion 342'. The base panel 341' includes a circular sleeve portion 344' arranged on the brake portion 321'. Each adjustment screw 343' has an end portion 345' facing the track 40'. The adjustment screws 343' are adjustable to compensate for manufacturing, installation, and wear errors, while maintaining the optimal locking effect of the retaining portion 342' relative to the riving knife 20'.

Figure 9:
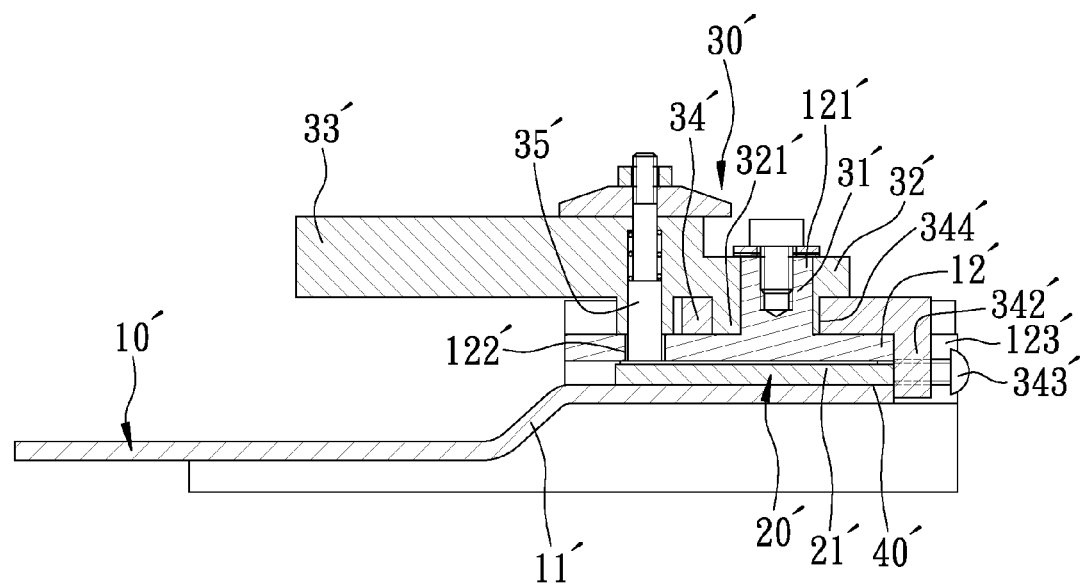
FIG. 9 is a sectional view taken along line IX-IX of FIG. 8.

Referring to FIGS. 8 and 9, when the riving knife 20' is locked in position, the brake 32' of the locking unit 30' brakes the retaining portion 342' of the locking member 34' against the coupling portion 21' of the riving knife 20', and two of the three notches 211' of the coupling portion 21' of the riving knife 20' are forced into engagement with the protruding locating portions 151' of the fastening members 15', and the spring-loaded pin 35' is inserted into the locating hole 122' of the constraint block 12' to prohibit rotation of the brake 32'. Therefore, the riving knife 20' is locked to the locating member 10' in a first locked position.

Figure 10:
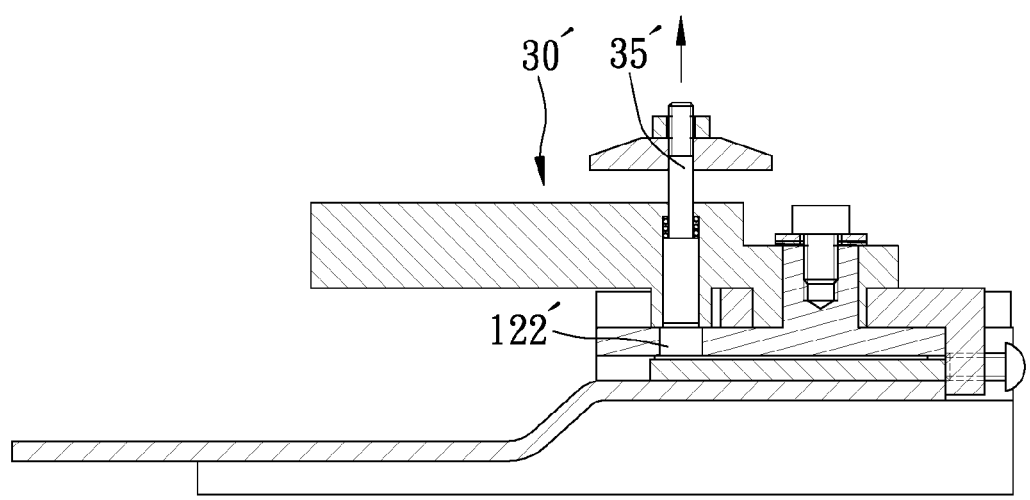
FIG. 10 is a schematic drawing of the second embodiment of the present disclosure, illustrating the spring-loaded pin pulled out of the locating hole of the constraint block.
Figure 11:
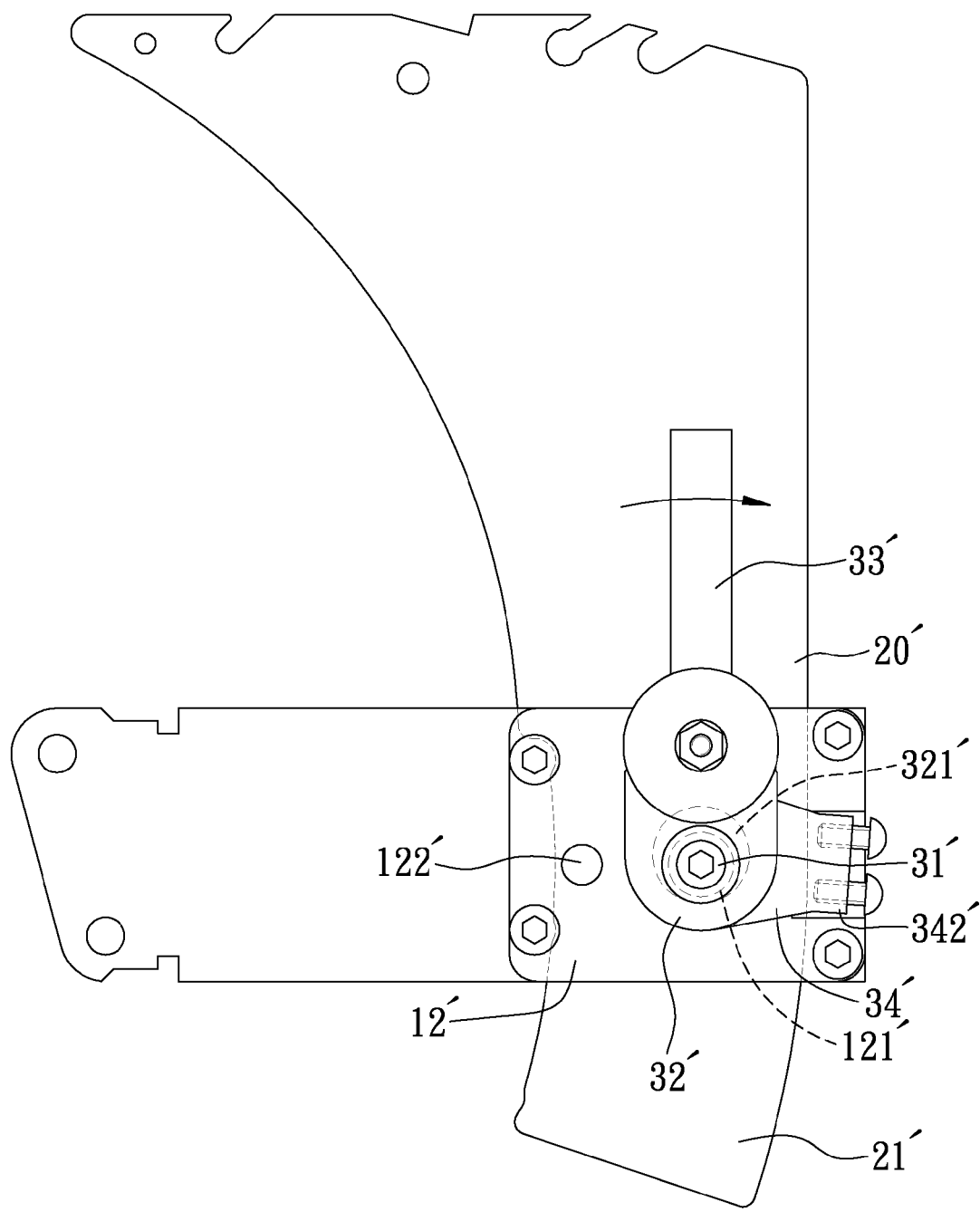
FIG. 11 is a schematic drawing of the second embodiment of the present disclosure, illustrating the brake in a rotated position, and the riving knife moved relative to the locating member.

In order to adjust (or replace) the riving knife 20', as shown in FIG. 10, the spring-loaded pin 35' of the locking unit 30' is pulled away from the locating hole 122' of the constraint block 12', and then, as shown in FIG. 11, the operating member 33' is manipulated to rotate the axle holder 31' relative to the brake 32'. Due to the eccentric rotation of the brake portion 321' relative to the axle holder 31', the retaining portion 342' of the locking member 34', and hence the adjustment screws 343' are moved away from engagement with the coupling portion 21' of the riving knife 20' into an unlocking and/or adjusting position, thus allowing adjustment of the position of the riving knife 20' relative to the locating member 10' or removal of the riving knife 20' from the saw machine riving knife adjustment mechanism in exchange for a replacement.

After adjustment of the position of the riving knife 20 or the replacement thereof, the user can reverse the brake 32' to return the locking member 34' to the locking position, as shown in FIG. 8, where the spring-loaded pin 35' is automatically returned to its former position and inserted into the locating hole 122' of the constraint block 12' to lock the brake 32'. Therefore, the riving knife 20' is locked to the locating member 10' in an adjusted position (a second locked position).

Although particular embodiments of the disclosure have been described in detail for purposes of illustration, various modifications and enhancements may be made without departing from the spirit and scope of the disclosure. Accordingly, the disclosure is not to be limited except as by the appended claims.

What is claimed is:

1. An adjustable riving knife assembly installed in a machine base having a top wall, the adjustable riving knife assembly comprising:
   a locating member disposed below said top wall of said machine base, and including a track defined thereby, said track extending along a longitudinal axis toward said top wall of said machine base;
   a riving knife having a coupling portion adjustably and slidably inserted into said track of said locating member so as to be adjustable in a longitudinal direction along said longitudinal axis; and
   a locking unit disposed below said top wall of said machine base and installed on said locating member, said locking unit comprising a brake and a locking member, said brake including a brake portion eccentrically disposed with respect to a rotation axis, said brake rotatable about said rotation axis to lock said riving knife with or release said riving knife from said locating member, and said locking member having a circular sleeve portion defining a through hole;
   wherein said locking unit further comprises an axle holder and an operating member, said axle holder affixed to said locating member, and said operating member connected to said brake, said brake portion received in the through hole of the sleeve portion and rotatably mounted to said axle holder so that the brake portion is eccentrically rotatable about said rotation axis, the rotation axis extending perpendicular to said longitudinal axis and intersecting said track, said locking member being movable by said brake portion and having a retaining portion inserted into said track, said operating member operable to rotate said brake causing said brake portion to move said locking member between a locking position, where said retaining portion engages and locks said riving knife to said locating member, and an unlocking position, where said retaining portion is disengaged from said riving knife for allowing movement of said riving knife relative to said locating member.

2. The adjustable riving knife assembly according to claim 1, wherein said axle holder of said locking unit is a post extending along said rotation axis; said brake portion is round block shaped; and said retaining portion is connected to a periphery of said sleeve portion and is located adjacent the coupling portion of said riving knife.

3. The adjustable riving knife assembly according to claim 2, wherein said locating member comprises a body base and a constraint block mounted on one side of said body base, said track defined between said constraint block and said body base, said constraint block comprising a cutout opening extending therethrough and into said track, and two protruding locating portions disposed adjacent to said track; said locking member comprises a base panel; said retaining portion extending from a first end of said base panel and inserted into said cutout opening; and said riving knife comprises three notches formed in an edge thereof and disposed at different elevations, two of said notches being respectively selectively engaged with said protruding locating portions to lock the riving knife in position.

4. The adjustable riving knife assembly according to claim 3, wherein said locking unit further comprises at least one adjustment screw mounted in said retaining portion, each at least one adjustment screw having an end portion adapted for engaging said riving knife; and said locating member has a plurality of fastening members mounted thereon to affix said constraint block to said body base, said fastening members having a part thereof disposed at an inner side relative to said track, said part forming said protruding locating portions.

5. The adjustable riving knife assembly according to claim 4, wherein said locating member further comprises a locating hole; said locking unit further comprises a spring-loaded pin installed in said brake and movable in and out of said locating hole to lock said brake with respect to said locating member or to unlock said brake for allowing rotation of said brake relative to said locating member.

6. The adjustable riving knife assembly according to claim 1, wherein said locating member comprises a body base and a constraint block mounted on one side of said body base, said track defined between said constraint block and said body base, said constraint block comprising a cutout opening extending therethrough and into said track.

* * * * *